F. C. W. MAHNE.
AUTOMOBILE HEATING APPARATUS.
APPLICATION FILED MAY 16, 1914.
1,116,088.
Patented Nov. 3, 1914.
2 SHEETS—SHEET 1.
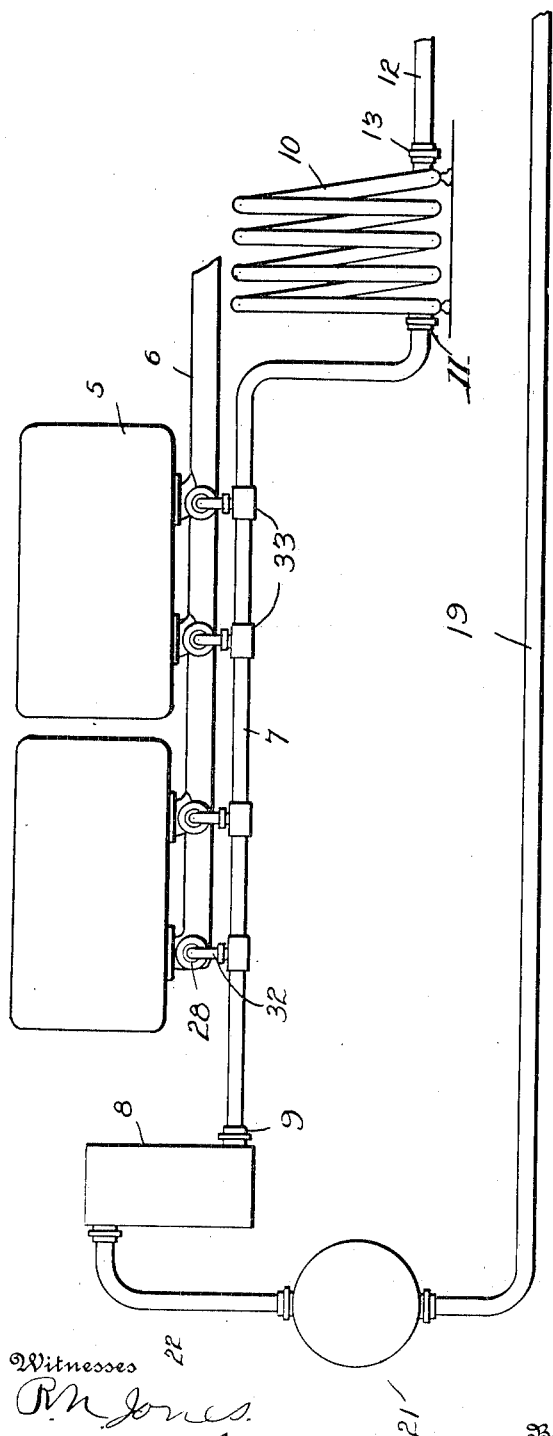
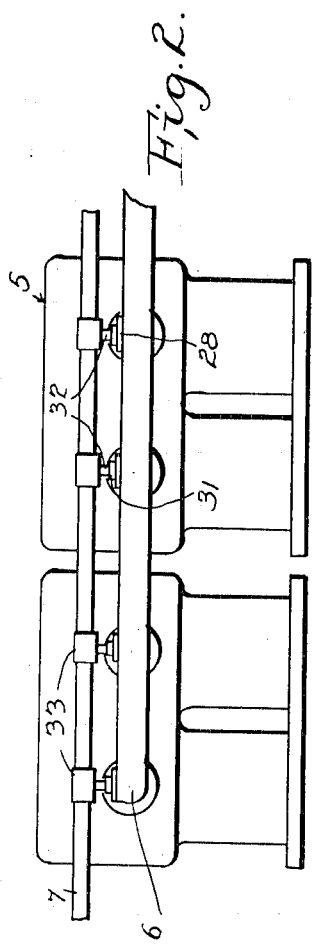
Witnesses
R. M. Jones.
Chas. A. Munn.
Inventor
F. C. W. Mahne.
By A. Randolph Jr.
Attorney.

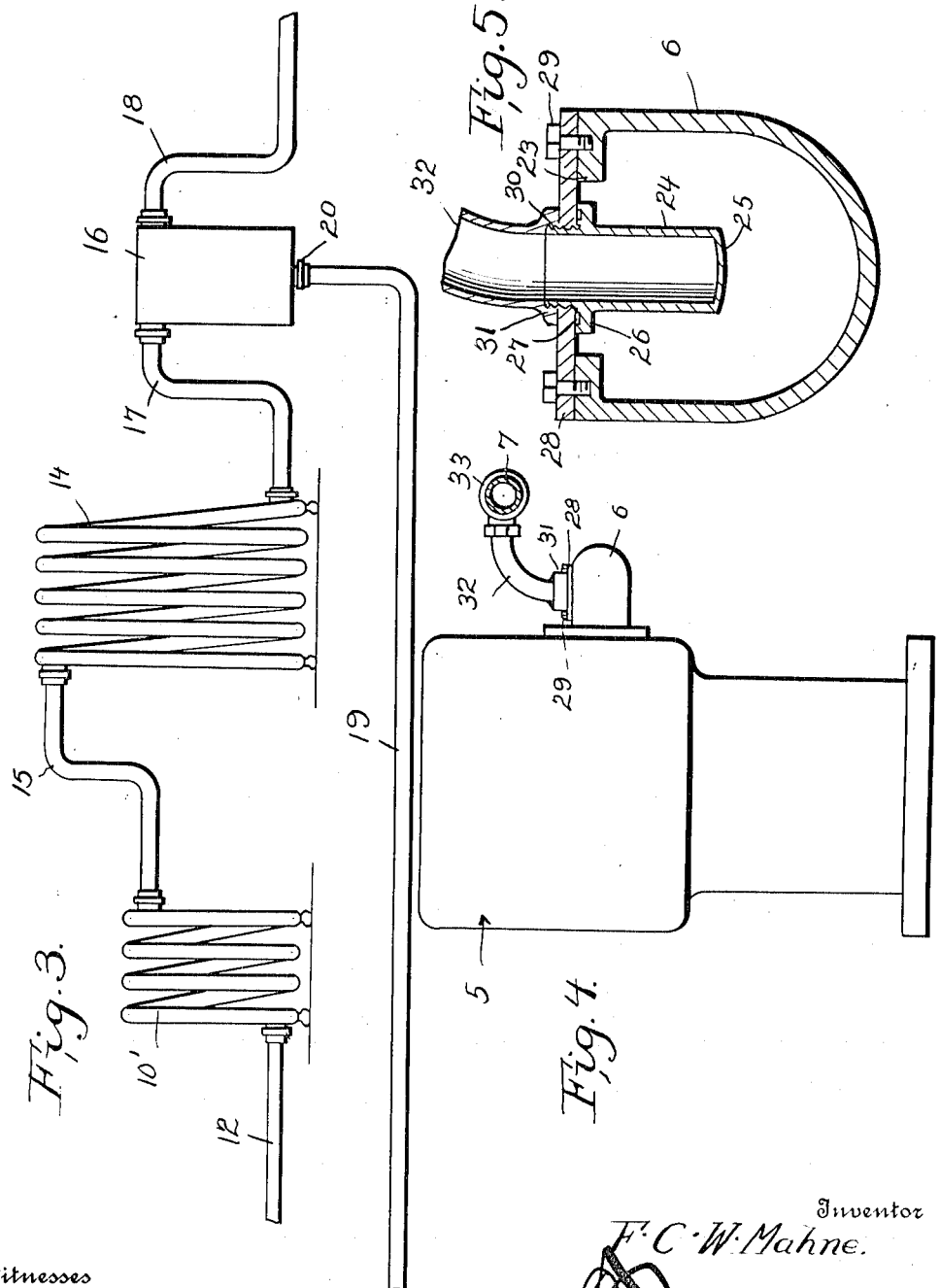

UNITED STATES PATENT OFFICE.

FREDERICK C. W. MAHNE, OF MILWAUKEE, WISCONSIN.

AUTOMOBILE HEATING APPARATUS.

1,116,088. Specification of Letters Patent. Patented Nov. 3, 1914.

Application filed May 16, 1914. Serial No. 839,044.

*To all whom it may concern:*

Be it known that I, FREDERICK C. W. MAHNE, a citizen of the United States, residing at Milwaukee, in the county of Milwaukee and State of Wisconsin, have invented certain new and useful Improvements in Automobile Heating Apparatus, of which the following is a specification.

My invention relates to new and useful improvements in apparatus for heating automobiles and has for its object to provide simple and inexpensive apparatus which comprises radiators to be arranged adjacent or beneath the seats of an automobile, a pump, a water supply tank, pipes connecting the radiators and pump and tank, and means for connecting certain of said pipes with the exhaust manifold so that the heat from the exhaust manifold will heat the water in the pipes.

An important object of my invention is to provide a tank that is connected with the radiators so as to receive the water that has passed through the radiators, said tank being provided with means to allow steam to escape and being operatively connected with the pump so that the water therein is conducted back to the water supply tank.

Another important object of my invention is to provide apparatus of the character described which is simple as to construction, reliable and efficient in operation and cheap to install.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts: Figure 1 is a fragmentary plan view showing a portion of my apparatus connected with the exhaust manifold of an automobile engine. Fig. 2 is a fragmentary side elevation showing the manner of connecting one of the pipes with the manifold. Fig. 3 is a side elevation showing the radiators and tank to receive the water therefrom, said tank being shown below its normal position which is above the level of the coils for the sake of clearness. Fig. 4 is an end elevation showing one of the pipes connected with the exhaust manifold and said pipe in section, and Fig. 5 is a vertical sectional view taken through the manifold of the engine showing the means for connecting one of the apparatus pipes with said manifold.

Referring to the drawings by characters of reference the numeral 5 designates as an entirety an automobile engine provided with an exhaust manifold 6. My improved apparatus comprises a horizontal pipe 7 that is connected to a water supply tank 8 as at 9. The pipe 7 is connected at its other end with a radiator 10 as at 11, said radiator being formed of a number of pipe coils. A radiator 10' similar to the one 10 is connected with the radiator 10 by means of a pipe which is connected at one end with the radiator 10' and designated 12 and at its other end is connected with the radiator 10 as at 13. The radiators 10 and 10' are approximately of the same size but are spaced from each other so as to heat different parts of the automobile. A large radiator 14 formed similarly with relation to the radiators 10 and 10' is connected with the radiator 10' by means of a pipe 15. This large radiator 14 is to be arranged in the rear or tonneau of the automobile.

A tank 16 is connected with the large radiator 14 by means of a pipe 17 and is provided with a steam outlet pipe 18. This tank 16 is to receive the water after it is passed through the radiators and is connected with a water return pipe 19 as at 20 to enable the water to be returned to the supply tank 8. The other end of the pipe 19 is connected with a suitable pump 21 that is arranged adjacent to the supply tank 8 and connected therewith by means of a pipe 22. The pump 21 may be operated by an engine after a manner not shown and it will be readily seen that I have provided a circulating system for the water which is provided by the pumping action of the pump 21.

As clearly shown in Fig. 5 the exhaust manifold is open at the top at spaced points and provided with inwardly extending lugs or flanges 23. A plurality of tubular members 24 having one end open and a closed end 25 are arranged within the exhaust manifold 6 at spaced points with their closed ends 25 innermost. The tubular members 24 are provided with annular flanges 26 adjacent their upper terminals which are provided with circumferential grooves upon their upper faces to receive suitable packing rings 27. Mounted upon the lugs 23 and arranged to close the openings in the exhaust manifold 6 are closure plates 28 that are secured by screws 29 or other suitable fastening means, said screws 29 being inserted through the plates 28 and into the lugs 23. The plates 28 are provided with central screw threaded openings through which are inserted the upper screw threaded portions 30 of the tubular members 24.

The packing 27 in the flanges 23 engages the under faces of the plates 28 and provides a tight joint. The upper screw threaded extremities 30 of the tubular members 24 extend beyond the outer faces of the plates 28 and are arranged to have secured thereto the flared internally screw threaded ends 31 of curved connecting pipes 32. The externally screw threaded portions 30 are turned in the internally screw threaded portions 31 of the pipes 32. The pipes 32 are suitably connected with the pipe 7 as at 33 and thus provide for the heating of the water that is to be circulated through the system.

It will be readily seen that the pipe 7 is connected with the exhaust manifold 6 through the medium of the pipes 32, tubular members 24 and coöperating parts, in such a way that the heated gases in the exhaust manifold serve to heat the water in the system.

In operation when the water is put into the system, the tubular members 24 are filled with water and upon the starting of the engine 5 the heated gases in flowing through the exhaust manifold 6, heat the water contained in the tubular members 24. The heated water in the tubular members 24 rises and flows into the pipe 7 and the pressure provided by the pump 21 serves to circulate the heated water through the radiators and other pipes of the apparatus.

The water after flowing through the radiators passes into the tank 16 and any steam which may have generated is permitted to escape through the pipe 18. From the tank 16 the water is permitted to flow back to the supply tank 8 by the pump action provided by the pump 21. The radiators 10 and 10′ and 14 may be suitably arranged in an automobile to provide the desired heating thereof, the radiators 10′ and 14 being preferably arranged in the rear compartment or tonneau of the automobile.

The apparatus may be readily connected with the exhaust manifold of the automobile engine in a reliable and expeditious manner through the medium of the pipes 32, tubular members 24 and coöperating parts.

It will be readily seen with reference to the foregoing description and accompanying drawings that I have provided simple and inexpensive apparatus which may be readily and cheaply installed in automobiles and will operate to heat the compartments of the automobile in a reliable and effective manner and thus provide for the comfort of the occupants of the automobile in cold weather.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. In automobile heating apparatus, the combination with the exhaust manifold of an engine, a plurality of radiators connected with each other, a water supply tank, a pipe connecting the water supply tank and the radiators, a pump, pipes connecting the pump with the supply tank and radiators, and means to connect the first named pipe with the exhaust manifold comprising tubular members having certain ends closed disposed within said exhaust manifold and pipes connecting the open ends of said tubular members with said first named pipe, said tubular members being detachably connected at their open ends with said last named pipe.

2. In automobile heating apparatus, the combination with the exhaust manifold of an engine of a water supply, radiators connected with the water supply, a pipe connecting the radiators with the water supply and means to connect said pipe with the exhaust manifold comprising tubular members having one end closed disposed within said manifold, said manifold being formed with spaced openings to receive said tubular members, centrally apertured closure plates to close the openings in said manifold and support said tubular members, said tubular members extending outwardly from said plates at their open ends, and pipes connecting the outer open ends of said tubular members with said first named pipe, said tubular members being detachably connected with said last named pipes at their open ends and the closure plates.

3. In an automobile heating apparatus, the combination with an exhaust manifold of an engine of a water supply manifold connected with a water supply, and means to connect said water supply manifold with the exhaust manifold comprising tubular members having certain ends closed disposed within said exhaust manifold, said exhaust manifold being formed with spaced openings to receive said tubular members, centrally apertured closure plates to close the openings in said exhaust manifold and support said tubular members, said tubular members extending outwardly from said plates at their open ends and pipes connecting the open ends of said tubular members with said water supply manifold, a flange formed adjacent the open ends of the tubular members exteriorly thereof, said tubular members being externally screw threaded adjacent their open ends and being detachably connected with said pipes and closure plates, said flanges engaging the under faces of the said closure plates.

In testimony whereof I affix my signature in presence of two witnesses.

FREDERICK C. W. MAHNE.

Witnesses:
 MAX STIEG,
 LEVI A. LARSON.